IMAGE PROJECTION

Filed May 7, 1959 2 Sheets-Sheet 1

INVENTOR.
ROBERT W. GUNDLACH
BY Stanley Z. Cole
ATTORNEY

INVENTOR.
ROBERT W. GUNDLACH
BY Stanley Z. Cole
ATTORNEY

United States Patent Office 3,166,419
Patented Jan. 19, 1965

3,166,419

IMAGE PROJECTION

Robert W. Gundlach, Spencerport, N.Y., assignor to Xerox Corporation, a corporation of New York Filed May 7, 1959, Ser. No. 811,592
6 Claims. (Cl. 96—1)

This invention deals generally with xerography and in particular with development and viewing of developed images.

Recently in the art of xerography, as disclosed in copanding application, Serial No. 738,520, now abandoned, there has been found a novel technique and novel apparatus for viewing xerographic images. The technique disclosed in the aforesaid copending application involves the use of specularly reflected light to create a projected image on a screen or the like for viewing purposes.

This invention is an improvement over the invention in copending application Serial No. 738,520, now abandoned, and involves rapid development of an electrostatic image bearing surface through a transfer of particles from a developer dispensing surface or donor member resulting in an image pattern on the donor member as well as on the electrostatic image bearing surface. These images are photographically reversed of one another, and the image on the developer dispensing surface or donor as well as that on the electrostatic image bearing surface may be projected or viewed according to this invention. A new flexibility is thus added to the xerographic projection art in that a choice is given for selectively projecting positive or negative images, or if desired, projecting both images at the same time. Further, since an image may now be projected from the developer dispensing surface and since a wide latitude exists as to the choice of materials for this surface, as will be discussed herein, brighter images of higher quality may be projected more rapidly by the techniques of the present invention as compared with previously known systems.

It is accordingly an object of this invention to disclose new systems and techniques of image projection.

It is a further object of this invention to disclose new xerographic projection techniques rapidly yielding high quality bright images.

It is a further object of this invention to disclose xerographic projection techniques wherein an image is projected from a developer dispensing surface.

It is a further object of this invention to disclose novel projection apparatus.

It is yet another object of this invention to disclose novel apparatus to project images from the surface of the donor member.

It is a still further object of this invention to disclose novel xerographic projection apparatus permitting the optional projection of either negative or positive images or both together.

For a better understanding of the invention and the objects thereof, reference is had to the following description and claims to be read in conjunction with the drawings, wherein:

FIG. 1 is a schematic representation of the preparation of a developer dispensing surface according to an embodiment of the invention;

FIGS. 2–A and 2–B are schematic representations of stages of image development according to embodiments of the invention;

Figure 1:
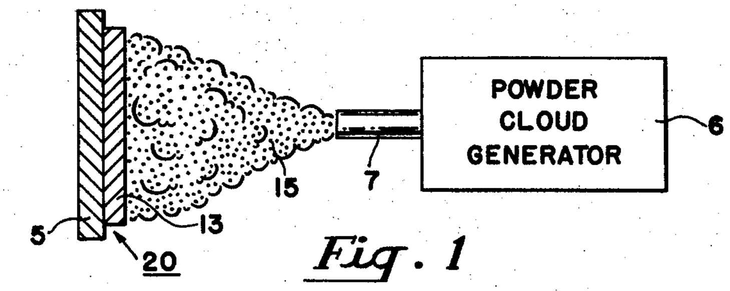

Referring now to FIG. 1, there is illustrated schematically a method of preparing a developer dispensing member 20 having a dispensing surface 13, and in this embodiment a base 5. A requirement of member 20 is that at least surface 13 should be specularly reflecting and should be sufficiently smooth and free from ripples or waviness as to permit reflection with a minimum of distortion. This requirement for member 20 may be satisfied by any of a wide variety of constructions. The member can be electrically conductive and may conveniently be a sheet of metal such as steel, stainless steel, or aluminum with at least one polished surface 13, or it may comprise a sheet of these or other metals with a polished coating of chromium or the like on surface 13. Member 20 may also comprise a non-conducting member such as a sheet of glass or plastic or substantially any other support base having a thin specular reflecting coating, such as evaporated aluminum or chemically deposited silver on surface 13. When the body of member 20 is transparent or substantially so, then the opposite surface of member 20 may be loaded with powder. In such case specular reflection from surface layer 13 can be employed in accordance with an embodiment of this invention after light passage through the transparent base 5. Member 20 can be either rigid or flexible as desired.

Dispensing surface 13 of member 20 is coated with a thin uniform layer 15 of developer particles by blowing a cloud of particles from powder cloud generator 6 through nozzle 7 toward surface 13. The particles should be small in size and particularly less than about 20 microns in diameter to permit high quality image development. Where continuous tone images are to be developed, a particle size of about 5 microns or less is generally preferred. The particles should also be effective in scattering light, but this requirement is met by virtually all powder materials. Finally, the powder should meet other obvious requirements, i.e., it should be non-toxic, non-corrosive and preferably non-hygroscopic. Many powders meet these requirements, but powdered charcoal has been found to be particularly useful. A cloud of powder particles is directed toward member 20 from nozzle 7 until just sufficient powder adheres to substantially mask the specularly reflecting properties of surface 13. This will correspond to a specular reflection density between 1 and 3 and generally about 2. At this point, the powder cloud generator 6 is turned off, and developer dispensing member 20 is ready for further use. The method of FIG. 1 is shown for illustrative purposes only as many modifications or alternatives may be used for depositing a uniform layer of powder. For example, the powder particles are generally tribo-electrified by passage through nozzle 7 and the rate of powder deposition may be increased by maintaining an electric field between member 20 and nozzle 7 in a direction to atttract the powder particles toward surface 13 of member 20. Entirely different techniques may also be employed. Thus, member 20 may be dipped into a container of powder or into a mixture of powder and a coarse granular carrier therefor, or such a mixture may be poured over surface 13. Powder may also be deposited by rubbing surface 13 with a brush or brush like member impregnated with the desired powder material. The above methods are presented for illustrative purposes and are not intended to constitute an exhaustive list of suitable means for applying a uniform powder layer to surface 13 of member 20.

Although charcoal is the preferred developer material, other developers may also be used. This includes either electrically conductive or insulating particles depending on the embodiment of this invention being followed. Accordingly, the developer material may comprise any of a number of various carbon or lamp black materials, finely divided materials having added pigment such as resins containing pigments or dyes, metallic particles and generally all xerographic developer materials.

Figure 2A:
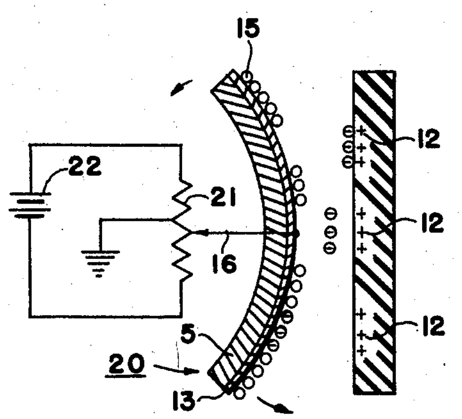
Figure 2B:
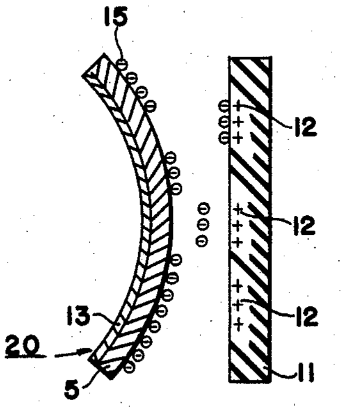

Referring now to FIG. 2, there is illustrated schematically two embodiments of use of developer dispensing or donor members 20 in developing electrostatic images. As shown, developer dispensing members 20 are brought to and removed from electrostatic image bearing layers 11 of insulating material. In this figure members 20 are illustrated as spaced apart from electrostatic image bearing layers 11. This has been done, however, only for the sake of clarity, whereas in reality apparent physical contact should exist between members 20 and members 11. As stated, electrostatic image bearing layer 11 comprises an insulating material in order to maintain an electrostatic image on its surface. The resistivity of layer 11 should at least be sufficient to permit the storage of an electrostatic image from the time of its formation until it is developed by contact with member 20 as shown in the figure. Considering that necessary storage times are generally of the order of several seconds and that the characteristic decay time of layer 11 is its resistivity times its time constant, in MKS units, it is seen that layer 11 will typically have a resistivity of at least about $10^{12}$ ohm-centimeters. Obviously, the resistivity may be somewhat lower where rapid processing is employed, and must be higher where longer times are involved.

In the embodiment of FIG. 2–A there is illustrated development employing conductive powders at an electrical potential. Accordingly, both powder layer 15 and powder dispensing member 20 in FIG. 2–A should have a resistivity which is at least several orders of magnitude less than that of the electrostatic image bearing layer 11. In a preferred form of this invention, layer 11 may be a commercially available xerographic plate which comprises a photoconductive insulating layer on a mechanical support layer. On the surface of electrostatic image bearing member 11 is a charge image or pattern 12 which may be of either polarity, but is represented in this figure as a positive charge pattern. As illustrated, at least the conductive surface 13 of developer dispensing member 20 is maintained at a fixed but adjustable potential by means of lead 16, battery 22 and tapped potentiometer 21.

When dispensing member 20 and electrostatic image bearing layer 11 are placed together as shown about midway up in FIG. 2–A, the charges of image pattern 12 induce charges of opposite polarity in the adjacent particles of powder layer 15. This can occur, because both the dispensing member and the powder particles are conductive and thus charge can flow through the dispensing member into the powder particles in response to the electric field set up by the charges of charge pattern 12. Once the charges are induced onto the powder particles, and this occurs almost instantaneously, these particles are strongly attracted by the opposite polarity of image pattern 12. Accordingly, these particles detach themselves from the dispensing member and attach themselves instead to electrostatic image bearing layer 11 as shown in the top portion of FIG. 2–A. After transfer to layer 11 these particles tend to remain there, because of the insulating character of layer 11 which prevents the charges on the powder particles and in image pattern 12 from neutralizing each other. There is thus formed on layer 11 a powder representation of charge pattern 12. At the same time there is formed a corresponding pattern on member 20 represented by the absence of powder particles. As stated in different form in connection with FIG. 1, the density or thickness of powder layer 15 should be such that removal of powder therefrom will substantially increase the specular reflection coefficient of member 20 in areas from which powder has been removed.

One can control the particular particles which move to the surface of image bearing layer 11 in FIG. 2–A by controlling the potential applied through lead 16 to developer dispensing member 20. For example, by applying to developing dispenser 20 a potential equal in sign and polarity to the highest potential on the image bearing layer 11, particles transfer from layer 15 to image bearing layer 11 in areas corresponding to no charge on the charge bearing surface. Thus, if a potential of 400 volts positive exists in image areas on the surface of image bearing layer 12, applying a potential of 400 volts positive to developer dispensing member 20 will prevent the induction of charge into particles facing image charges and instead will create a strong field between the developer dispensing member 20 and image bearing layer 11 in areas of no charge. This will cause charge to be induced into particles of layer 15 on developer dispensing member 20 corresponding to areas of no charge on the surface of image bearing layer 11 and these particles in consequence of their charge will move across to the surface of image bearing layer 11. Generally also, if image layer 11 is on a conductive backing charge of opposite polarity to the charge induced into the particles will be induced into the backing member in areas corresponding to no charge on the surface of the image layer. When no backing member exists a surface charge should be allowed to feed to the back surface of image layer 11 as through the use of an A.C. corona spraying to the rear surface or a grounded roller rolling over and against this surface or the like.

Development, as just described, is development of uncharged areas, and if illustrated in FIG. 2–A would show particles of layer 15 remaining on surface 13 transferred to the surface of image bearing layer 11 and particles on the surface of image bearing layer 11 remaining on surface 13. This form of development is sometimes desirable to allow a choice as to whether a photographic positive and a photographic negative of an image is to be formed on surface 13 and layer 11 respectively, or vice versa, and depending on whether the original material being reproduced is photographically negative or positive.

Referring now to FIG. 2–B, there is illustrated another embodiment of image development in accordance with this invention. As in FIG. 2–A image bearing layer 11 bears charges 12 making up an image pattern across a surface and donor member 20 comprising support layer 5 and surface layer 13 is being moved to the image bearing surface of layer 11 at the lower portion of FIG. 2–B and away from the image bearing surface of layer 11 at the upper portion of FIG. 2–B. In that portion not indicated as being moved to or away from image layer 11 the representation shows donor member 20 spaced from image layer 11, but as previously disclosed these members are in apparent physical contact and spacing is only included in the drawing in order to simplify understanding. In this embodiment surface 13 is shown separated from particle layer 15 in dispensing member 20. However, as pointed out previously, this surface may be adjacent to particle layer 15, but when spaced from particle layer 15 as illustrated in FIG. 2–B, then support layer 5 should be transparent or substantially so. Donor member 20 in FIG. 2–B has been loaded with powder particles as illustrated in FIG. 1 and to the level previously discussed. In this embodiment of the invention, as distinct from the embodiment illustrated in FIG. 2–A, neither the powder particles making up particle layer 15 nor developer dispensing member 20 need be conductive, nor need the particles be connected to potential source. In fact, preferably the particles are not conductive and they may adhere to the surface of donor member 20 through electrostatic attraction. Even though the particles are insulating, if desired, a potential may be applied to developer dispensing member 20. The potential may be applied at the rear surface as, for example, at surface 13 or if the entire dispensing member comprises a conductive material, then it may be applied directly to the conductive material on which the particle layer 15 resides. Development in accordance with this embodiment of the invention is commonly known in the art as "sheet development" and is more fully described in copending patent applications Serial Nos. 399,293, now Patent 2,895,847, 505,963, now Patent 2,901,374, and 692,512, now Patent 2,880,699. In these aforementioned copending applications the general concept of development is the use of a sheet member which may be compared to the carrier employed in carrier-toner development supporting a layer of toner particles. The particles are maintained on the sheet through electrostatic attraction and are released to the image bearing layer for development purposes because of greater attraction to the surface being developed. These particles which move to the image bearing layer move selectively as controlled by the charge pattern on the surface and further as controlled by the level of charge on the particles. Thus, if one is developing a positive charge pattern as illustrated in FIG. 2–B and the particles are negatively charged prior to being brought to the surface to be developed as through the use of corona or the like as described in the aforementioned copending applications, particles move as shown in the upper portion of FIG. 2–B to the charged areas 12 on image bearing layer 11. To accomplish development of the uncharged areas on image bearing layer 11, particles 15 along the surface of developer dispensing member 20 may be charged to a positive polarity prior to being brought to image bearing layer 11 for development purposes. This will result in an attractive field between uncharged areas on the surface of image bearing layer 11 and charged particles 15 on the surface of developer dispensing member 20 will transfer to the surface of image bearing layer 11 in uncharged areas. No field will exist in charged areas between the particles and the charges 12 on the surface of image bearing layer 11, and accordingly, no particles will move to these areas.

The method of electrostatic image development shown in FIGS. 1 and 2 has been found to be effective for developing continuous tone as well as line copy images. Thus, in practice the amount of powder transfer from layer 15 to layer 11 is approximately proportional to the local intensity of the charge pattern 12 on layer 11.

Generally, and for best operation it is preferred that insulating layer 11 overlies a conductive layer which is not shown in this figure since the invention may be made to operate without such a layer.

Figure 3:
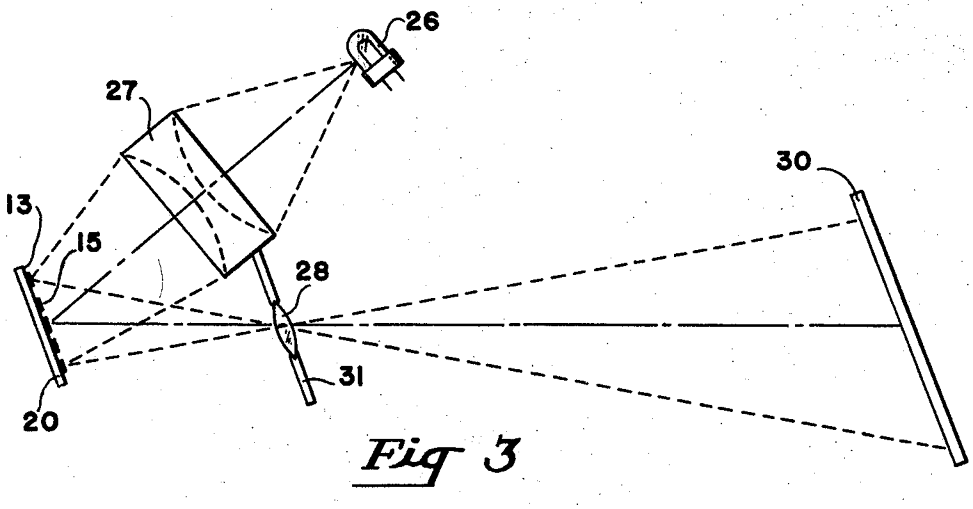
FIG. 3 is a schematic representation of image projection according to this invention.

After removal of powder dispensing member 20 from electrostatic image bearing layer 11, the image produced on dispensing member 20 may be projected as shown in FIG. 3. In this figure specular reflecting surface 13 is shown directly beneath the image. However, it should be realized that if the embodiment of development of FIG. 2–B had been employed the image would be separated from specular layer 13 by a transparent layer and projection would take place also in accordance with the description which follows. Directed to dispensing surface 13 of member 20 are light rays from light source 26 fed through condenser 27. The surface 13 of member 20, being a specularly reflecting surface, reflects the incident light from source 26 and condenser 27 to and through lens 28 and to image receiving screen 30. The remaining portion of powder layer 15 or the image on member 20 acts to scatter and absorb the incident light rather than to direct it through lens 28. However, to assure that scattered light from powder layer 15 does not weaken the image projected to screen 30, a shield 31 is positioned about lens 28 to prevent any scattered light from powder layer 15 from passing beyond lens 28 toward screen 30. Lens 28 is positioned at a proper distance from dispensing member 30 to focus surface 13 onto screen 30 and at the same time light source 26, condenser 27 and layer 13 are positioned to focus light source 26 at lens 28.

Image receiving screen 30 may comprise a diffuse opaque reflecting surface such as a sheet of paper or a solid member covered with white paint, aluminum paint or a layer of glass beads, or it may comprise a conventional projection screen, or it may comprise a translucent diffusing surface such as ground glass or tracing paper in which case the projected image may be viewed from either side of image receiving screen 30.

In connection with the illustration in this figure, and as should be apparent to one skilled in the art, a higher quality image is projected when the image resides directly on the specular surface, and accordingly, the preferred embodiment of this invention includes image formation directly on the specular reflecting surface of the donor member and projection of such an image. The description which follows will be limited to the preferred embodiment described in connection with FIG. 2–A. However, it is to be realized that this is being done only to simplify description, and there is no intention to be limited only to this embodiment.

Figure 4:
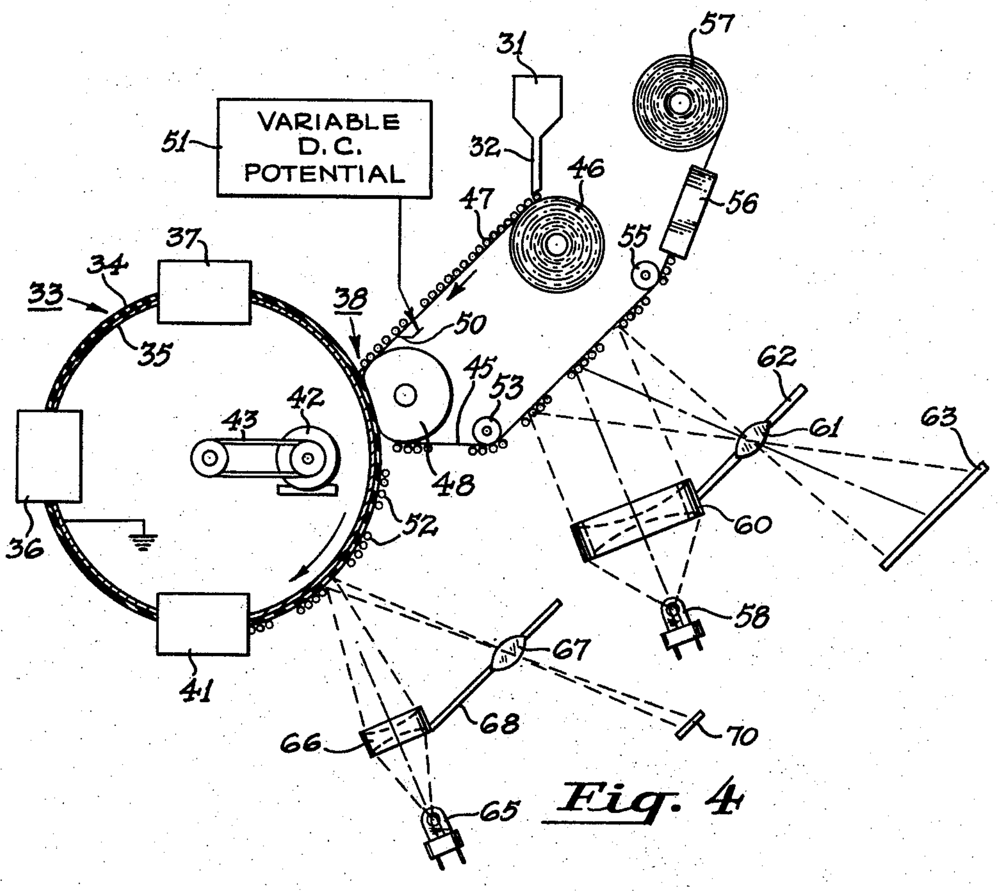
FIG. 4 is an embodiment of image formation and projection apparatus according to this invention; and, FIG. 5 is another embodiment of the development station of apparatus according to this invention.

FIG. 4 illustrates an embodiment of a continuous automatic type of machine according to this invention. The apparatus in this figure is constructed about a xerographic drum 33 which is preferably, although not necessarily, specularly reflecting. A suitable specularly reflecting xerographic drum is the Copyflo drum, available from Haloid Xerox, Inc., Rochester, New York, which comprises a layer of photoconductive insulating selenium 34 overlying a conductive support layer 35. Such a drum generally has a specular reflection coefficient ranging between about 20% and 30%. Various stations are positioned about the drum circumference, and as the drum is rotated by motor 42 through belt drive 43, sections of the drum sequentially and repetitively move through the various processing stations. Starting at the beginning of the xerographic cycle, an electrostatic charge is placed on the drum at charging station 36 to sensitize photoconductive insulating layer 34. This may be accomplished through the use of corona discharge, discharge from a radioactive source, roller charging or the like. Following charging, the drum moves to exposure station 37 where the uniform charge on the surface is changed to an image pattern through selective dissipation of charge brought about through the exposure of the drum to a light or other radiation pattern. Following exposure, the drum is moved into developing station 38 where the image pattern of charge on the surface of photoconductive insulating layer 34 is developed through the deposition of powder particles in accordance with the charge configuration. Positioned at development station 38 is a web of conductive specularly reflective material 45 such as a foil led from supply spool 46. Powder cloud generator 31 discharges a gaseous suspension of finely divided insulating particles at the surface of web 45 to deposit a uniform powder layer 47 thereon. Just as in the embodiment of FIGURES 1, 2 and 3, the powder layer should be just thick enough to substantially mask the specularly reflecting characteristics of web 45. Powder layer 47 may also be pre-loaded to web 45, and if a pre-loaded web is employed the machine does not require the presence of powder cloud generator 31 and nozzle 32. Regardless of whether powder layer 47 is applied at the machine or in some prior operation, any of the powder deposition methods described in connection with FIG. 1 may be employed in connection with the illustration of FIG. 4. Web 45 passes beneath resilient roller 48 which maintains light pressure contact between web 45 and xerographic drum 33, thereby bringing powder layer 47 into contact with the surface of the photoconductive insulating layer 34. Powder layer 47 is an electrically conductive material and is connected to a potential source 51 through spring contact 50 to conductive web 45. Contact may also be accomplished through any of the rollers around which the web moves if the roller is conductive. As discussed in connection with FIG. 2–A, charges are induced into the developer particles selectively in accordance with the pattern to be developed and in this embodiment (assuming the potential applied is about ground) particles of powder layer 47 are preferentially attracted to the charged areas of the photoconductive insulating layer 34 to form a powder deposit 52 and at the same time are removed from the surface of web 45 resulting in a photographic negative on the surface of web 45 of powder deposit 52. Web 45 is next fed over guide roller 53, guide roller 55, through fuser 56 and onto take-up spool 57. Fuser 56 is included in this embodiment to permanently fix the powder image to the surface of web 45 where this is desired. Alternatively, the fuser may be omitted, or not used, and the web fed directly to the take-up spool 57 or alternatively the remains of powder layer 57 may be cleaned from the web after it passes over roller 55 and before it is wound onto take-up spool 57. As should be apparent, if the web is cleaned, it may be in the form of an endless belt and may continuously feed through a web cycle. While web 45 is held between guide rollers 53 and 55, an image is projected therefrom in accordance with the projection system described in FIG. 3. Thus, light 58 sends light through condenser 60 to the surface of web 45 between rollers 53 and 55. This light, except in areas where powder layer 57 is still present, is specularly reflected back through lens 61 and onto screen 63. The optical relations between the light source, condenser, reflecting surface, lens and screen are the same as described in connection with FIG. 3. As in that figure, a shield 62 is positioned around lens 61 to intercept light diffusely scattered from powder layer 47.

Following image development, drum 33 in this embodiment moves to projection station 40 comprising lamp 65, condenser 66, lens 67, mask 68 and screen 70. In this second projection system an image is projected from the developed surface of the xerographic drum 33 to screen 70. There is thus provided in this apparatus a means of optionally projecting either a photographic positive, photographic negative or both of the charge pattern formed by exposure station 37 depending upon whether the image on drum 33 or on the web 45 or both is projected, since the image on the surface of drum 33 is photographically reversed from that on the surface of web 45.

After projection station 40, the xerographic drum 33 moves to a cleaning station 41 where the powder image 52 is removed from the drum to permit the reuse thereof in the already-described sequence of operations. When projection from the surface of drum 33 is not desired, projection station 40 may be replaced by a transfer station to transfer the developed powder image 52 from the surface of the xerographic drum 33 onto a transfer material such as paper or the like.

Figure 5:
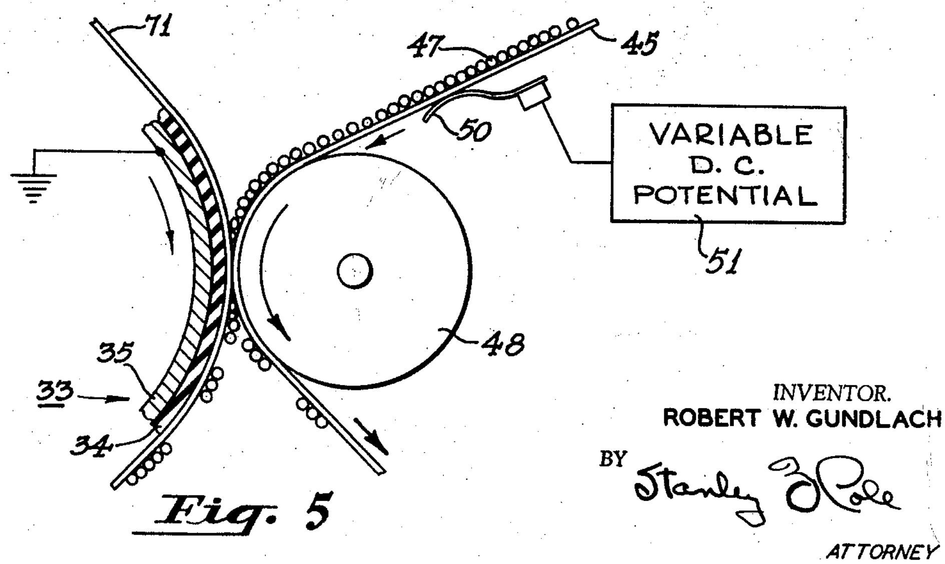

As a further alternative there is illustrated in FIG. 5 a partial section of an embodiment of equipment in accordance with this invention. This embodiment is particularly valuable if it is desired to avoid particle deposition on the surface of the xerographic drum. Thus, this embodiment avoids cleaning and other problems which result when particle deposition on the surface of the drum takes place. In addition, there is produced in accordance with this embodiment a web carrying a developed image which may be fused and preserved for record purposes, if desired.

Considering now FIG. 5, there is illustrated a portion of a drum generally designated 33 comprising a photoconductive insulating layer 34 overlying a conductive grounded backing member 35. At the development station shown in this figure a conductive developer dispensing member 45 carrying particles 47 is moved between roller 48 and drum 33 in the direction indicated by the arrows. Connected to conductive web 45 is a variable D.C. potential source 51 connected through spring contact 50. Potential source 51 may be varied to apply potential in accordance with the discussion of FIG. 2–A to result in development of either the charged areas or the uncharged areas, as desired, and the formation of a photographically reversed image on the surface of web 45 following passage between roller 48 and drum 33. Interposed between particle layer 47 on web 45 and drum 33 in the zone where web 45 is positioned between roller 48 and drum 33 is a web 71 of relatively insulating material. Web 71 may comprise pre-dried paper, insulating plastic materials or the like. Characteristically, web 71 should be sufficiently insulating to prevent degradation of the fields between image drum 33 and conductive web 45 so as to insure quality particle movement and development across the surface of web 71 thereby assuring high quality image formation along the surface of web 45. As previously discussed in connection with FIG. 4, web 45 may be moved into a projection station. The image on its surface may be projected to a viewing screen on which it may be examined. Web 71 carrying a developed image may be utilized by permanently fixing the image to the surface of web 71 as through passage through a fuser such as fuser 56 in FIG. 4. If desired, following fixing the image permanently, the image may be stored on a spool or chopped up into picture lengths or the like as is known in the art. Other uses which will readily occur to those skilled in the art may also be made of the developed image on the surface of web 71. It is also to be realized that web 71 could also be specularly reflective and as such may be used in a projection system of the type illustrated in FIG. 3 and embodied in the apparatus of FIG. 4.

While this invention has been described and discussed in terms of a particular projection arrangement to project an image from the donor member or developer dispensing member, it is to be realized that substantially all known projection arrangements may also be used and there is no intention to limit this invention to projection only of an optical image formed through specular reflection. However, a projected image produced through specular reflection is a major improvement over the art and is preferred over other projection arrangements in this invention.

While various embodiments of the present invention have been disclosed and various uses of the present invention have been described, as should be readily apparent many other applications and variations exist and it is not desired to be limited only to the particular embodiments and applications described herein, but it is intended to cover the invention broadly within the spirit and scope of the appended claims.

What is claimed is:

1. A method of projecting and recording an image which comprises:

(A) providing a developer dispersing member having a specularly reflecting surface;

(B) coating said member with electrostatic developing particles at least just sufficiently to substantially mask the specularly reflecting properties of its surface;

(C) contacting said developer dispersing member with an electrostatic image bearing layer, said layer comprising a photoconductive insulating material having a resistivity at least sufficient to permit the storage of an image from the time of formation until contact with said dispersing member;

(D) thereby allowing said developer to be attracted by an opposite polarity of the image pattern on said image bearing layer thereby detaching themselves from said dispersing member and attaching to the electrostatic image bearing member and (E) thereby forming a pattern on said dispersing member by the absence of developer thereon corresponding to a negative of the positive image formed on said image bearing member;

(F) separating said dispersing member from said image bearing member;

(G) and specularly projecting the image formed on said dispersing member to an image receiving member while substantially simultaneously recording the image formed on said electrostatic image bearing member by transferring the developed image to a transfer member.

2. The method of claim 1 wherein said specularly reflecting surface is coated with said developer particles to a level to produce on said surface a specular reflectivity density of from about 1 to about 3.

3. The method of claim 2 wherein said specularly reflecting surface is brought into contact with said electrostatic image bearing layer while said specularly reflecting surface is electrically biased.

4. The method of claim 3 wherein said specularly reflecting surface is biased at about ground potential.

5. The method of claim 3 wherein said specularly reflective surface is biased to a potential equal to about the highest level of potential on said image bearing layer and of about the same polarity as the charge pattern on said image bearing layer.

6. A method of projecting and recording an image which comprises:

(A) providing a developer dispersing member having a specular reflecting surface;

(B) coating said member with electrostatic developing particles at least just sufficiently to substantially mask the specularly reflecting properties of its surface;

(C) interposing a web of relatively insulating material between and in contact with an electrostatic image bearing layer and said coated specularly reflecting surface;

(D) thereby causing particle deposition on said web and permitting said developing particles to detach themselves from said dispersing member and attaching to said web;

(E) forming a pattern on said dispersing member by the absence of developer throughout corresponding to a negative of the positive image formed on said web;

(F) separating said dispersing member from said imaged web;

(G) and specularly projecting the image formed on said dispersing member to an image receiving member while providing a substantially permanent image recorded and transferred on said web.

References Cited in the file of this patent

UNITED STATES PATENTS

| | | |
|---|---|---|
| 1,902,907 | Semenitz | Mar. 28, 1933 |
| 2,758,525 | Moncrieff-Yeates | Aug. 14, 1956 |
| 2,771,002 | Mayo et al. | Nov. 20, 1956 |
| 2,817,598 | Hayford | Dec. 24, 1957 |
| 2,839,400 | Moncrieff-Yeates | June 17, 1958 |
| 2,862,816 | Moncrieff-Yeates | Dec. 2, 1958 |
| 2,895,847 | Mayo | July 21, 1959 |
| 2,901,374 | Gundlach | Aug. 25, 1959 |
| 2,940,847 | Kaprelian | June 14, 1960 |
| 2,968,552 | Gundlach | Jan. 17, 1961 |
| 2,996,400 | Rudd et al. | Aug. 15, 1961 |
| 3,083,623 | Mott | Apr. 2, 1962 |

FOREIGN PATENTS

| | | |
|---|---|---|
| 723,534 | Great Britain | Feb. 9, 1955 |

OTHER REFERENCES

Photography (I), January 1958, vol. 13, No. 1, page 57 (London).

Photography (II), January 1958, vol. 13, No. 1, pages 44–47 (London).

Purves: "The Focal Encyclopedia of Photography," Focal Press, London, 1957 (1st edition), page 926 relied on.